July 26, 1949.　　　O. G. MAYER, JR　　　2,477,413
SAUSAGE SMOKE RACK
Filed Nov. 29, 1945
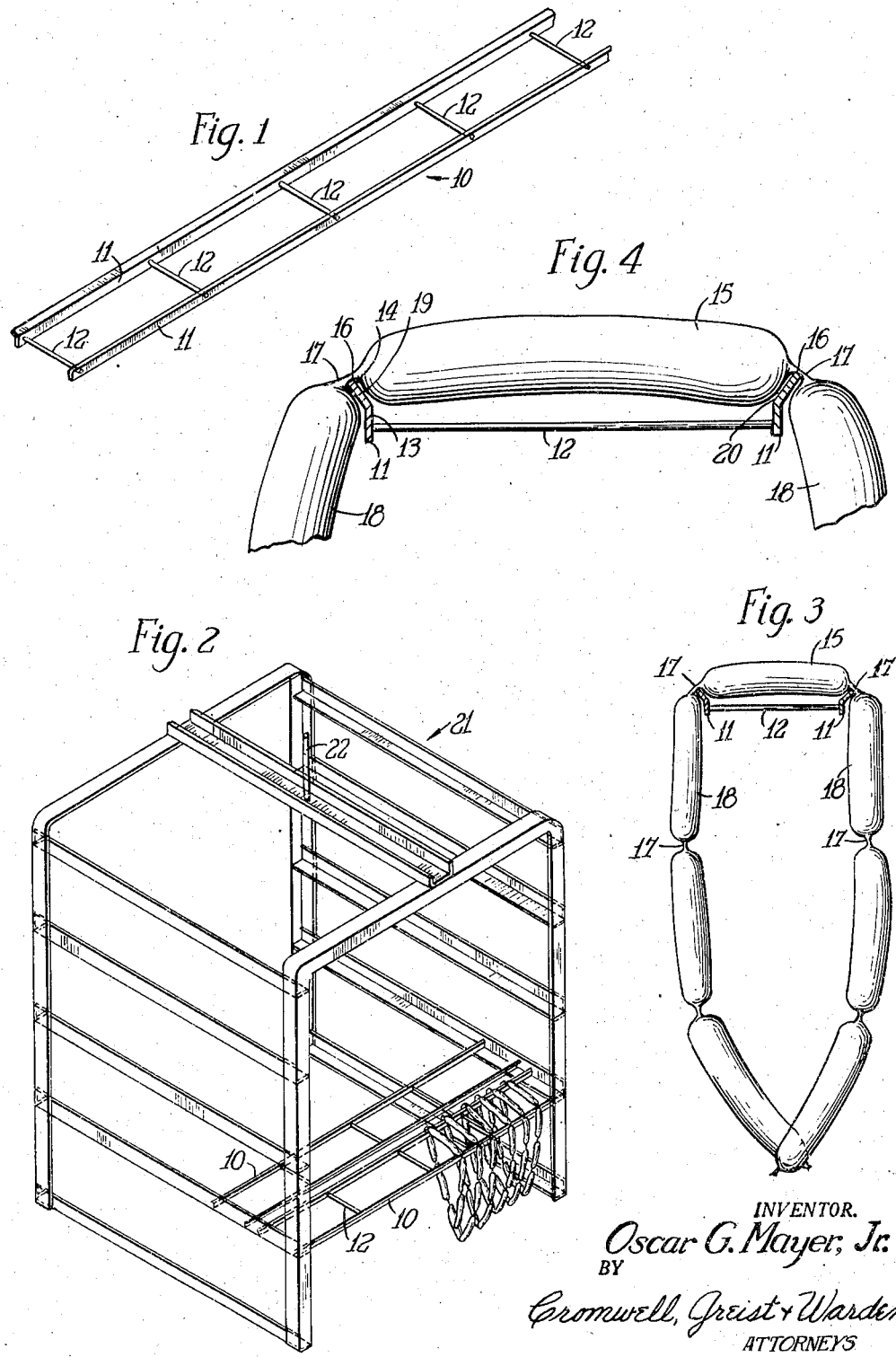
INVENTOR.
Oscar G. Mayer, Jr.
BY
Cromwell, Greist & Warden
ATTORNEYS Patented July 26, 1949

2,477,413

UNITED STATES PATENT OFFICE 2,477,413

SAUSAGE SMOKE RACK

Oscar G. Mayer, Jr., Evanston, Ill., assignor to Oscar Mayer & Co., Inc., Chicago, Ill., a corporation of Illinois Application November 29, 1945, Serial No. 631,663

4 Claims. (Cl. 17—44.4)

My invention is concerned with improvements in smoke sticks or racks of the type which are used in supporting link sausages during the curing, smoking, cooking and chilling operations.

In the manufacture of meat products such as smoked sausages, it is customary to hang the linked sausages on smoke sticks or racks which are placed in spaced relation in a sausage cage. The latter is then positioned in a smoke house or other chamber, or in successive chambers, where the sausages are subjected to the processing operations.

It is desirable to provide a device which will support a string of link sausages in such a manner that during the processing operations the sausages will not be in contact with each other and will not be in contact with the surface of the smoke stick with any appreciable degree of pressure, so that all the sausages will be properly smoked and cooked without leaving any light spots or unsmoked areas, which spots are unsightly and subject to rapid deterioration.

It is an object of my invention to provide a smoke stick or rack which will support link sausages during the smoking and cooking operation out of contact with each other and in such a manner that each sausage will be fully subject to the smoking and cooking operations and any pressure contact with the smoke stick will be had solely at the connections between the sausages.

It is a further object of my invention to provide a smoke stick which will support link sausages by contact with the connecting tissue areas between the sausages and in such manner that the sausages hanging from the stick will not be subject to abrupt bending stresses whereby hooked ends and curved portions will be avoided and a final product having a more uniform shape will be obtained.

Other objects of my invention are to provide a smoke stick comprising thin blade-like sausage supporting elements which will not unduly obstruct the circulation of the smoke and other fluids in the processing chamber, which is light in weight yet sturdy enough to withstand the hard usage encountered in a packing house, and which is simple and inexpensive to manufacture.

The above objects as well as others will be apparent from a description of my device, the preferred form of which is shown, by way of example, in the accompanying drawings, wherein:

Fig. 1 is a perspective view of my improved smoke stick;

Fig. 2 is a perspective view of a sausage cage showing an empty smoke stick and a partially loaded one arranged thereon;

Fig. 3 is a transverse section of my smoke stick with sausage links arranged thereon; and Fig. 4 is an enlarged view of the upper portion of Fig. 3.

The preferred form of my improved smoke stick 10, as illustrated in the drawings, comprises two parallel blade-like plate members 11 arranged in a common horizontal plane and connected by spaced cross rods or brace members 12 secured to the plates 11 in any conventional manner. The plates 11 and the cross rods 12 may be made of any material of sufficient strength but are preferably constructed of metal and of a thickness to provide a rigid rack having sufficient strength to support the load normally placed thereon. Each of the plates 11 comprises a vertically arranged portion 13 and an upwardly and outwardly directed portion 14. The plates 11 are spaced apart a sufficient distance so that when a normal sausage link 15 is arranged thereon, as shown in Fig. 4, the only pressure contact with the smoke stick 10 will be on a relatively thin line between the top edge 16 of the portion 14 of the plates 11 and the portion of the casing, or tissue, 17 connecting the sausage 15 with the adjacent sausages 18. The weight of the sausages on each side of the sausage 15 will tend to tension the sausages 15 and 18 and hold their ends away from the plate surfaces 19 and 20, respectively. The sausages 18 will hang substantially vertical and hooked or bent ends thereon will be avoided. The sausages will also be supported without any tendency of the loops to twist into contact with each other. The normal length of the connecting tissue 17 is such that when sausages are arranged as shown in Fig. 4 there will be sufficient space to accommodate the thin blade-like portion 14 of the plate 11 without substantial pressure contact with the body or filled portion of the sausage. Consequently, when the sausages are subjected to the smoking and cooking operations the entire surface of all the sausages will be properly smoked and cooked and light spots or unsmoked areas will in large measure be avoided, thus eliminating subsequent loss due to premature spoilage at such areas. The sausages 15 and 18 adjacent the supporting plates 11 are held in tension along their longitudinal axes during the entire processing and hooked or curved ends are avoided thus resulting in a product of more uniform shape which enhances the appearance of the same and renders them much easier to handle and package.

In using my improved smoke stick 10, strings of sausages are arranged on each stick 10 and a plurality of loaded sticks are placed in a sausage cage 21 as shown in Fig. 2. The cage 21 is suspended by a member 22 from a conveyor track (not shown) and is placed in the processing chamber for the smoking and cooking operations.

In arranging the sausages on the stick 10, should the sausage 15 be oversize, or longer than normal it may be positioned thereon at an angle sufficient to avoid pressure contact between plate surfaces 19 and the filled portion of the sausage.

My rack construction will not necessarily eliminate all contact of the filled portions of the sausages 15, 18 with the side surfaces of the rack members but it will effectively eliminate any substantial pressure contact which would otherwise interfere with the proper processing of the meat, as distinguished from slight contact insufficient to prevent the processing or the formation of unsightly flat spots on the sausages.

While I have referred to specific details of construction in describing the preferred form of my device it will be understood that other forms may be resorted to within the spirit of my invention.

I claim:

1. A smoke stick comprising a pair of relatively thin rigid horizontally arranged plates, means rigidly connecting said plates in spaced parallel relation, said plates having vertically positioned base portions and upwardly and outwardly directed top portions spaced apart a sufficient distance to engage with the connecting casing between a sausage link positioned transversely above the plates and the adjacent links in a string of sausages and out of pressure contact with the filled portion of the sausages.

2. A smoke stick comprising a pair of relatively thin parallel spaced plates each having a substantially vertical lower portion and an upwardly and outwardly directed upper portion, said plates being spaced apart a sufficient distance to engage the upper edge of the plates with the connecting casing at the ends of a link in a string of sausages and to position the upper plate portions between and out of pressure contact with the ends of the connected sausages, and means rigidly connecting the lower vertical portions of said plates in fixed spaced apart relation.

3. A smoke rack for use in smoking a string of link type sausages, comprising two rigid horizontally arranged plate-like rail members having vertical base portions which are cross-connected at intervals in spaced parallel relation and upstanding thin blade-like sausage supporting portions, which portions are inclined outwardly in opposite directions to extend into the reentrant angles between adjoining sausages into pressure contact at their edges with the connecting tissues between the sausages so as to effect no appreciable deflection of the sausages when a string of sausages is draped over the rack with one sausage disposed horizontally between said blade portions and the adjoining sausages suspended from the ends of the horizontal sausage.

4. A sausage support for smoke house use, comprising a generally rectangular frame having a pair of relatively thin rigid plate-like side rail members and rigid transverse connecting members separating the lower portions of said rails in vertical spaced relation, said rail members having upper outwardly directed portions which are spaced apart a sufficient distance to engage only the tissue connecting adjacent sausages in a string whereby when said support is disposed horizontally for use and a sausage link is supported thereon adjacent sausages will depend therefrom without pressure contact between the filled portion of the sausages and the support.

OSCAR G. MAYER, Jr.

REFERENCES CITED

The following references are of record in the file of this patent:

UNITED STATES PATENTS

| Number | Name | Date |
|---|---|---|
| 1,320,219 | Flanagan | Oct. 28, 1919 |
| 1,859,040 | Kellermann | May 17, 1932 |
| 1,936,354 | Edwards | Nov. 21, 1933 |
| 2,107,166 | Rumsey | Feb. 1, 1938 |